(12) United States Patent
Cho et al.

(10) Patent No.: US 7,239,438 B2
(45) Date of Patent: Jul. 3, 2007

(54) VARIABLE FOCAL LENGTH LENS AND LENS ARRAY COMPRISING DISCRETELY CONTROLLED MICROMIRRORS

(75) Inventors: Gyoung Il Cho, Seoul (KR); Cheong Soo Seo, Seoul (KR); Tae Hyeon Kim, Taejeon (KR); Dong Woo Gim, Gyoungnam (KR)

(73) Assignees: Angstrom, Inc., Suwon (KR); Stereo Display, Inc., Anahein, CA (US)

( * ) Notice: Subject to any disclaimer, the term of this patent is extended or adjusted under 35 U.S.C. 154(b) by 55 days.

(21) Appl. No.: 10/893,039

(22) Filed: Jul. 16, 2004

(65) Prior Publication Data

US 2006/0012852 A1    Jan. 19, 2006

(51) Int. Cl.
*G02B 26/00* (2006.01)
*G02B 7/182* (2006.01)
*G02B 5/08* (2006.01)

(52) U.S. Cl. ............. 359/290; 359/291; 359/292; 359/849; 359/850

(58) Field of Classification Search ........ 359/290–292, 359/295, 298, 849–851, 296, 80, 853, 846, 359/741–743, 619–621, 865, 871–877, 652–628
See application file for complete search history.

(56) References Cited

U.S. PATENT DOCUMENTS

| | | | |
|---|---|---|---|
| 2,002,376 A | 5/1935 | Mannheimer | |
| 4,834,512 A | 5/1989 | Austin | |
| 5,986,811 A | 11/1999 | Wohlstadter | ............. 359/626 |
| 6,025,951 A * | 2/2000 | Swart et al. | ............. 359/245 |
| 6,111,900 A | 8/2000 | Suzudo | |
| 6,549,730 B1 * | 4/2003 | Hamada | ............. 396/111 |
| 6,658,208 B2 | 12/2003 | Watanabe et al. | ............. 396/89 |
| 6,833,938 B2 | 12/2004 | Nishioka | ............. 359/15 |
| 6,906,848 B2 * | 6/2005 | Aubuchon | ............. 359/291 |
| 2002/0102102 A1 | 8/2002 | Watanabe et al. | |
| 2005/0057812 A1 | 3/2005 | Raber | ............. 359/619 |
| 2005/0225884 A1 * | 10/2005 | Gim et al. | ............. 359/851 |

OTHER PUBLICATIONS

Kaneko et al., 2000, "Quick Response Dynamic Focusing Lens using Multi-Layered Piezoelectric Bimorph Actuator," Proceeding of SPIE vol. 4075: 24-31.
Cho, 2003, "Fast-response Variable Focusing Micromirror Array Lens," Proceeding of SPIE vol. 5055: 278-286.

* cited by examiner

*Primary Examiner*—Ricky Mack
*Assistant Examiner*—Brandi Thomas

(57) ABSTRACT

A discretely controlled micromirror array lens (DCMAL) consists of many discretely controlled micromirrors (DCMs) and actuating components. The actuating components control the positions of DCMs electrostatically. The optical efficiency of the DCMAL is increased by locating a mechanical structure upholding DCMs and the actuating components under DCMs to increase an effective reflective area. The known microelectronics technologies can remove the loss in effective reflective area due to electrode pads and wires. The lens can correct aberrations by controlling DCMs independently. Independent control of each DCM is possible by known microelectronics technologies. The DCM array can also form a lens with arbitrary shape and/or size, or a lens array comprising the lenses with arbitrary shape and/or size.

81 Claims, 9 Drawing Sheets

VARIABLE FOCAL LENGTH LENS AND LENS ARRAY COMPRISING DISCRETELY CONTROLLED MICROMIRRORS

BACKGROUND OF THE INVENTION

The present invention relates to a variable focal length lens consisting of a discretely controlled micromirror (DCM) array and operational methods for controlling the DCM array.

A widely used conventional variable focal length system makes use of two refractive lenses. It has complex driving mechanisms to control the relative positions of the refractive lenses. This conventional system also has a slow response time. Alternatively, variable focal length lenses can be made by changing the shape of the lens, as is done in the human eye. This method has been used in lenses made with isotropic liquids. Other lenses have been made of media with an electrically variable refractive index to create either a conventional lens or a gradient index lens by means of a voltage gradient. The electrically variable refractive index allows the focal length of the lenses to be voltage controlled. Among them, the most advanced variable focal length lens is a liquid crystal variable focal length lens, which has a complex mechanism to control the focal length. Its focal length is changed by modulating the refractive index. Unfortunately, it has a slow response time typically on the order of hundreds of milliseconds. Even though the fastest response liquid crystal lens has a response time of tens of milliseconds, it has small focal length variation and low focusing efficiency.

In summary, no variable focusing length lens has provided a fast response time, large focal length variation, high focusing efficiency, and adaptive phase control simultaneously.

To solve the limitations of the conventional variable focal length lens, a micromirror array lens was proposed. The details of the fast-response micromirror array lens are described in J. Boyd and G. Cho, 2003, "Fast-response Variable Focusing micromirror array lens," *Proceeding of SPIE* Vol. 5055: 278-286. The micromirror array lens mainly comprises a micromirror array and actuating components, and uses an electrostatic force to control the focal length of the lens. The focal length of the micromirror array lens is varied by varying the displacement of each micromirror. The practical use of the micromirror array lens is limited by the displacement range of the micromirror, high driving voltage, and complex electric circuits. These limitations are caused by establishing equilibrium between the electrostatic force and the elastic force to control the displacement of the micromirror.

To overcome these limitations, the discretely controlled micromirror (DCM) was invented. The details of the DCM are described in the applicant's U.S. patent application Ser. No. 10/872,241 for "Discretely Controlled Micromirror With Multi-Level Positions", which was filed on Jun. 18, 2004, the disclosure of which is incorporated by reference as if fully set forth herein. The DCM has a large displacement range, has low driving voltage, and is fully compatible with the microelectronics circuits. Two exemplary DCMs were invented, which are a Variably Supported Discretely Controlled Micromirror (VSDCM) and a Segmented Electrode Discretely Controlled Micromirror (SEDCM). The displacements of the VSDCM are determined by supports providing gaps of various width through which the DCM can move. The displacements of the SEDCM are determined by combinations of sizes, positions, and discrete voltages of segmented electrodes.

This invention provides a discretely controlled micromirror array lens (DCMAL) and DCMAL array consisting of DCMs to overcome the limitations of conventional micromirror array lens.

SUMMARY OF THE INVENTION

The present invention contrives to solve the disadvantages of conventional micromirror array lens.

The objective of the invention is to provide a discretely controlled micromirror array lens (DCMAL) with a large variation of focal length.

Another objective of the invention is to provide a DCMAL with low driving voltage compatible with known IC circuit operation and/or the control voltage of IC circuits. Conventional electrostatic micromirrors undergo the classical snap-down instability phenomenon when the electric force exceeds the elastic force. The snap-down phenomenon reduces the useful ranges of translation and rotation. The high driving voltage is also a disadvantage of the conventional electrostatic micromirrors in practical use. To be compatible with IC components, which normally operate at 5V, and to prevent electrical breakdown, the maximum value of the driving voltage should generally be as low as possible. The inaccuracy of the mirror displacement is another important disadvantage of the conventional electrostatic micromirrors. Therefore, the conventional micromirror array lens, which is described in "Fast-response Variable Focusing Micromirror Array Lens," *Proceeding of SPIE* Vol. 5055: 278-286", J. Boyd and G. Cho, 2003, has several limitations which are a small focal length change, a high driving voltage and an incompatibility with microelectronics circuits. These limitations are caused by using equilibrium between the electrostatic force and the elastic force to control the displacements of a micromirror. To overcome these limitations, the discretely controlled micromirror (DCM) was invented. The details of the DCM are described in the applicant's U.S. patent application Ser. No. 10/872,241 for "Discretely Controlled Micromirror With Multi-Level Positions", which was filed on Jun. 18, 2004, the disclosure of which is incorporated by reference as if fully set forth herein. In that reference, two exemplary DCMs were invented: a variably supported discretely controlled micromirror (VSDCM) and a segmented electrode discretely controlled micromirror (SEDCM). The VSDCM includes a micromirror and a plurality of variable supports on which the micromirror rests. The variable supports determine the position of the micromirror. The variable supports are located under the micromirror. Each of the variable supports is controlled to change its height whereby the position of the micromirror is controlled. The SEDCM includes a micromirror and a plurality of segmented electrodes. The segmented electrodes determine the position of the micromirror. The applied voltage to segmented electrodes is digital and/or discrete. The displacements of the VSDCM are determined by supports providing gaps of various width through which the DCM can move. The VSDCM has a large displacement range, has low driving voltage, and is compatible with microelectronics circuits. The displacements of the SEDCM are determined by combinations of sizes, positions, and discrete voltages of segmented electrodes.

The following six U.S. Patent Applications of the applicant describe variable focusing lenses having micromirrors, and an array of micromirror array lenses. U.S. patent application Ser. No. 10/855,554, which was filed on May 27, 2004, is for an invention entitled "Variable Focusing Lens Comprising Micromirrors with One Degree of Freedom Rotation." U.S. patent application Ser. No. 10/855,715, which was filed on May 27, 2004, is for an invention entitled "Variable Focal Lens Comprising Micromirrors with Two Degrees of Freedom Rotation." U.S. patent application Ser. No. 10/855,287, which was filed on May 27, 2004, is for an invention entitled "Variable Focal Lens Comprising Micromirrors with Two Degrees of Freedom Rotation and One Degree of Freedom Translation." U.S. patent application Ser. No. 10/855,796, which was filed on May 28, 2004, is for an invention entitled "Variable Focal Lens Comprising Micromirrors with One Degree of Freedom Rotation and One Degree of Freedom Translation." U.S. patent application Ser. No. 10/855,714, which was filed on May 28, 2004, is for an invention entitled "Array of Micromirror Array Lenses. U.S. patent application Ser. No. 10/857,280, which was filed on May 28, 2004, is for an invention entitled "Variable Focal Lens Comprising Micromirrors with One Degree of Freedom Translation." The disclosures of the applications are incorporated by reference as if fully set forth herein.

This invention provides a discretely controlled micromirror array lens (DCMAL) consisting of DCMs to overcome the limitations of conventional micromirror array lenses. The DCMAL is similar to the conventional micromirror array lens, but differs in that the lens or lens array consists of DCMs instead of conventional electrostatic micromirrors.

Each DCM has the same function as a mirror. Therefore, the reflective surface of the DCM is made of metal, metal compound, multi-layered dielectric material, or other materials with high reflectivity. Many known microfabrication processes can make the surface of a DCM to have high reflectivity. By making all light scattered from one point of an object have the same periodical phase and converge at one point of the image plane, the DCM array works as a reflective lens. The focal length of the lens is changed by controlling the translation, by controlling the rotation, or by controlling both the translation and the rotation of each DCM. The DCMAL formed by controlling only rotation has a relatively larger aberration than the lens with control of both translation and rotation since there is no translation to control the phase of light. The DCMAL formed by the control of only translation also has relatively larger aberration. For the DCMAL with pure translation, the smaller the size of the DCM, the less is the aberration. Even though the quality of the lens formed by control of either only translation or only rotation is lower than the quality of the lens formed by control of both rotation and translation, it is still an attractive lens design because its structure and its control are much simpler than the lens formed by control of both rotation and translation.

The DCMAL can be formed by a polar array of the DCMs. For the polar array, each DCM has a fan shape to increase its effective reflective area so that the optical efficiency increases. The optical efficiency of the DCMAL can be improved by locating a mechanical structure supporting a micromirror and the actuating components under the micromirror to increase its effective reflective area. Electric circuits to operate the DCM can be made with known MOS and CMOS technologies, which are widely used in microelectronics. By applying the microelectronics circuits under the micromirror array, the effective reflective area can be increased by removing the area that is required for electrode pads and wires. The aberration of the DCMAL can also be reduced by using DCMs with curved surfaces.

The DCMs are arranged to form one or more concentric circles to form the axisymmetric lens and the DCMs on the same concentric circle can be controlled by the same electrodes with concentric circular shape or independently controlled by making electric circuits required for independent control with known microelectronics technologies such as MOS or CMOS.

It is desired that each of the micromirrors has a curvature because the ideal shape of a conventional reflective lens has a curvature. If the size of each flat micromirror is small, then the aberration of the lens consisting of these flat micromirrors is also small. In this case, the micromirrors do not need to have a curvature.

By controlling each DCM independently, the lens can correct aberration, which is caused by optical effects due to the medium between the object and its image or is caused by defects of a lens system that cause its image to deviate from the rules of paraxial imagery. Independent control of each DCM is made possible by making electric circuits required for control with known microelectronics technologies and fabricating the circuits underneath the micromirrors using known microfabrication methods.

The array consisting of the independently controlled DCMs with two rotational degrees of freedom or two degrees of rotational freedom and one degree of translational freedom can form a lens with arbitrary shape and/or size, or a lens array comprising lenses with arbitrary shape and/or size. Therefore, incident lights can be modulated arbitrarily by forming arbitrary shape and/or size of a lens or a lens array comprising lenses with arbitrary shape and/or size. To do this, it is required that incident lights are deflected to arbitrary directions by controlling two rotational degrees of freedom or controlling two rotational degrees of freedom and one translational degree of freedom. Independent translation of each DCM is required to satisfy the phase condition.

The advantages of the present invention are: (1) the DCMAL has a large focal length variation because a large numerical aperture variation can be achieved by increasing the maximum rotational angle of the DCM; (2) The driving voltage is low. Therefore, the DCMAL is fully compatible with known IC circuit operation and semiconductor microelectronics technologies; (3) the DCMAL has very fast response time because each DCM has a tiny mass; (4) the DCMAL has a high optical focusing efficiency; (5) the DCMAL can have a large size aperture without losing optical performance. Because the DCMAL consists of discrete micromirrors, increasing the DCMAL size does not cause the an increase of aberration caused by lens shape error; (5) the DCMAL has a low cost because of the advantages of its mass productivity; (6) the DCMAL can correct aberration; (7) the DCMAL makes the focusing system very simple; (8) the DCMAL can have arbitrary shape and/or size.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with references to the accompanying drawings, wherein.

DETAILED DESCRIPTION OF THE INVENTION

Figure 1:
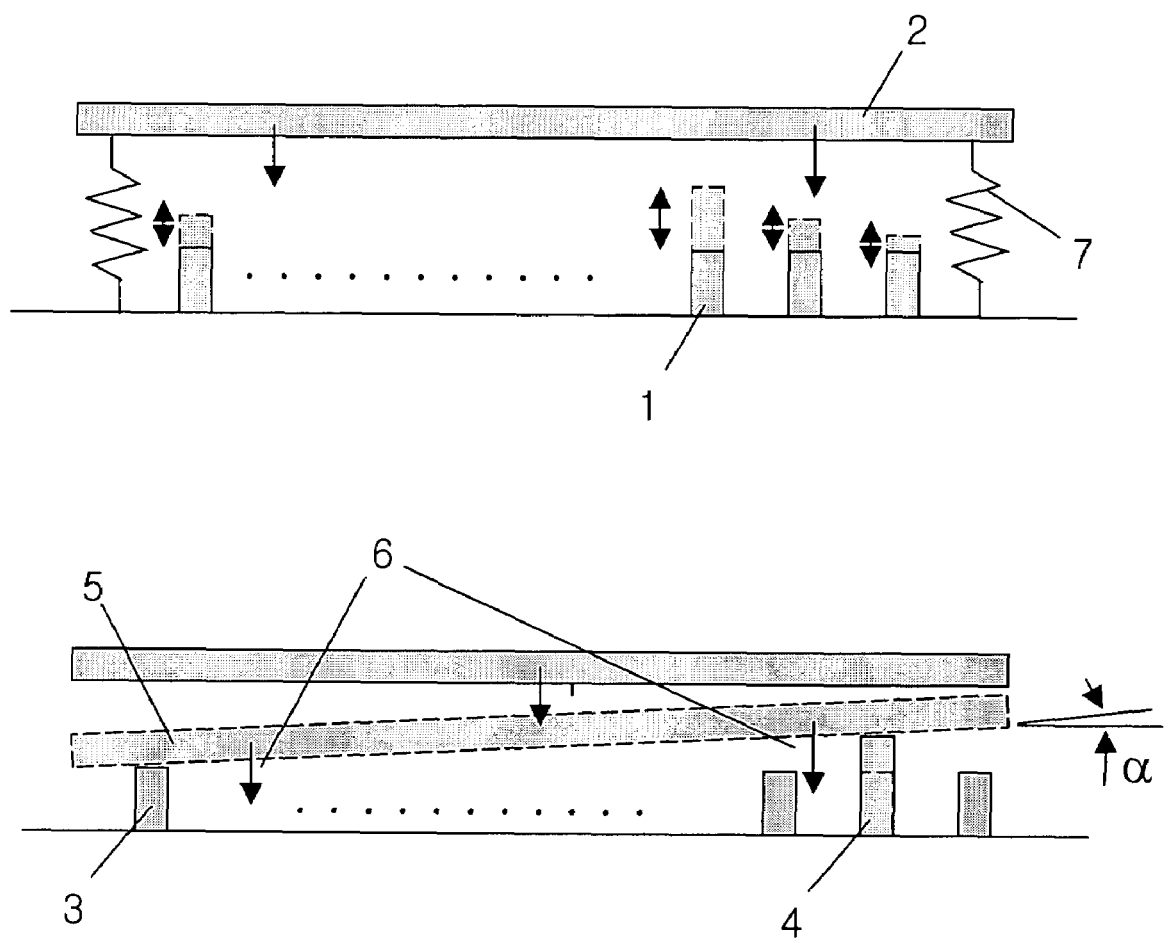
FIG. 1 is a schematic diagram showing the Discretely Controlled Micromirror (DCM) with variable supports.

FIG. 1 shows the concept of the DCM with the variable supports 1. The variably supported discretely controlled micromirror (VSDCM) uses supports 1 providing gaps of various width through which the micromirror can move. The supports 1 are located under the micromirror 2. Translation and rotation of the VSDCM are determined by combinations of gaps, which are determined by variable supports 3, 4 on which the micromirror 5 rests. Gaps determined by the variable supports are controlled and the micromirror rests on the controlled supports 3, 4 by attractive force 6. Therefore, the combination of gaps which the supports 3, 4 provide determines translation and rotation of the micromirror 2. Gap variation by the supports 3, 4 is determined by bistable motions of the supports 3, 4 and the motions are controlled by digital voltage. The position of micromirror 5 is restored to its initial position by the force of flexible spring 7 when the attractive force is off.

Figure 2:
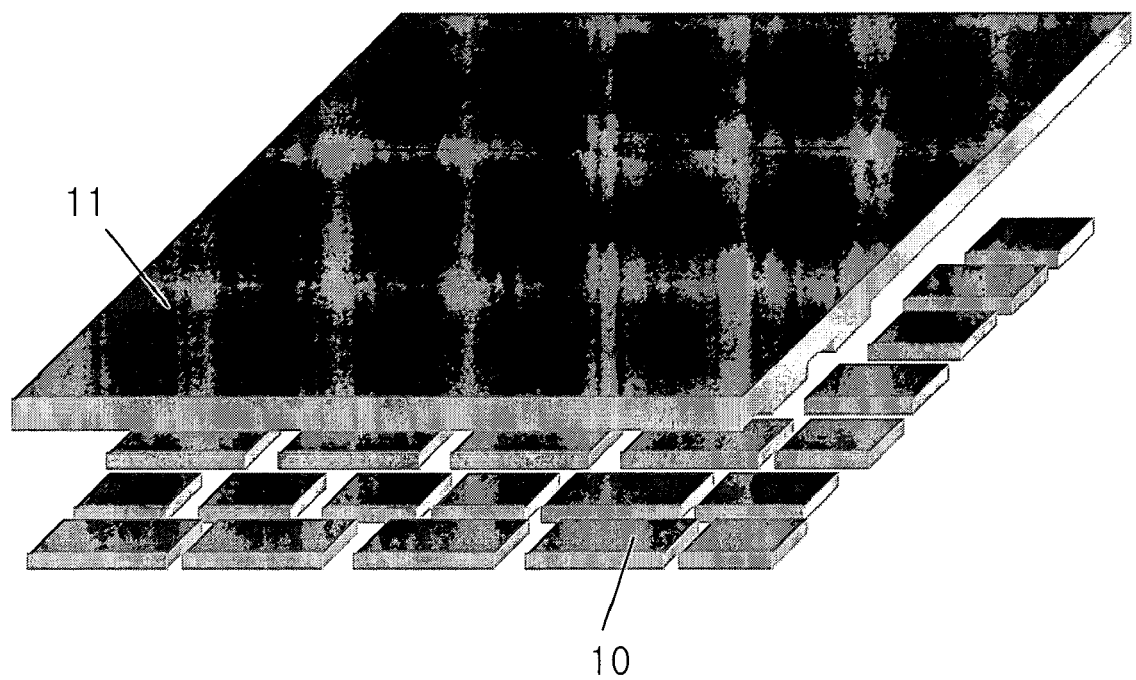
FIG. 2 is a schematic diagram showing the DCM using segmented electrodes.

FIG. 2 shows another type of DCM using segmented electrodes 10. The segmented electrode discretely controlled micromirror (SEDCM) has the same disadvantages as the conventional electrostatic micromirror except for the compatibility with known microelectronics technologies for the control circuits. The micromirror 11 can have the desired three degrees of freedom by the appropriate force combination of segmented electrodes 10 with different areas, positions, and discrete voltages.

Figure 3:
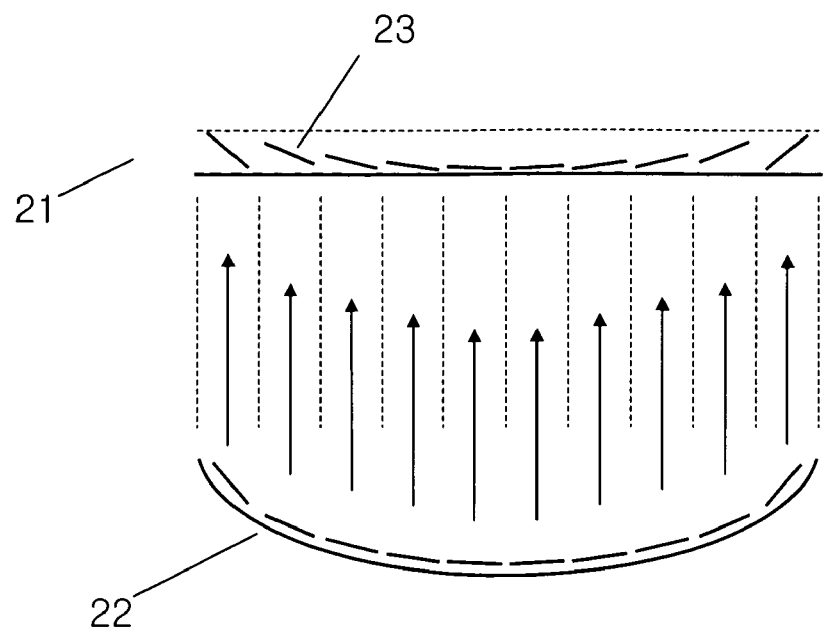
FIG. 3 is a schematic diagram showing the cut-away side view of a discretely controlled micromirror array lens (DCMAL)

FIG. 3 illustrates the principle of a DCMAL 21. There are two conditions to make a perfect lens. The first is the converging condition that all light scattered by one point of an object should converge into one point on the image plane. The second is the same phase condition that all converging light should have the same phase at the image plane. To satisfy the perfect lens conditions, the surface shape of conventional reflective lens 22 is formed to have all light scattered by one point of an object to be converged onto one point of the image plane and have the optical path length for all converging light rays.

A DCM array arranged in a flat plane can satisfy the two conditions to be a lens. Each of the DCMs 23 rotates to converge the scattered light. Because all DCMs 23 of the DCMAL 21 are arranged in a flat plane as shown in FIG. 3, the optical path lengths of lights converged by rotations of the DCMs are different. Even though the optical path length of converging light is different, the same phase condition can be satisfied by adjusting the phase because the phase of light is periodic.

Figure 4:
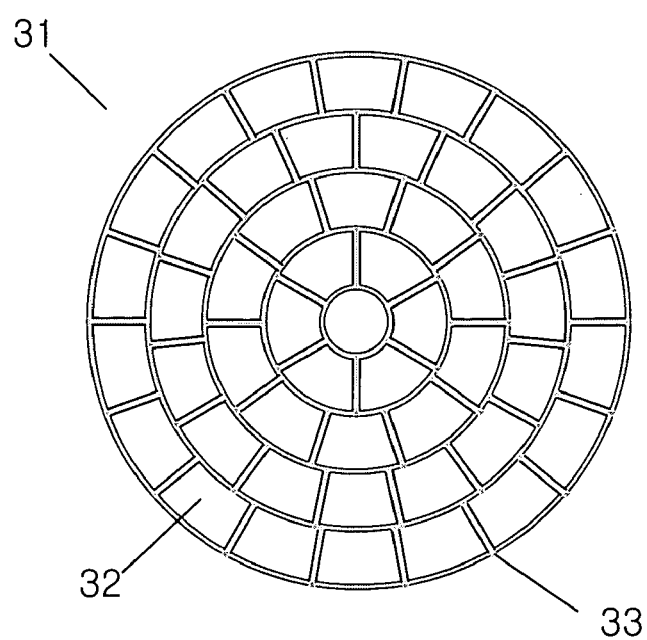
FIG. 4 is an in-plane schematic view showing one of the structures of a DCMAL consisting of a discretely controlled micromirror (DCM) array.

FIG. 4 illustrates the in-plane view of a DCMAL 31 having a plurality of DCMs 32. The DCM 32 has the same function as a mirror. Therefore, the reflective surface of the DCM 32 is made of metal, metal compound, multi-layered dielectric material or other materials with high reflectivity. Many known microfabrication processes can make the surface to have high reflectivity. Each DCM 32 is electrostatically controlled by actuating components 33. For the case of an axisymmetric lens, it is better that the DCMAL 31 has a polar array of the DCMs 32. Each of the DCMs 32 has a fan shape to increase its effective reflective area, which increases the optical efficiency. The DCMs are arranged to form one or more concentric circles to form the axisymmetric lens and the DCMs on the same concentric circle can be controlled by the same electrodes with concentric circular shape.

The mechanical structure upholding each reflective micromirror 32 and the actuating components 33 is located under the micromirror 32 to increase the effective reflective area. Also, the electric circuits to operate the micromirrors can be made with known microelectronics technologies such as MOS or CMOS. Making the circuits under the micromirror array can increase the effective reflective area by removing the area for the electrode pads and wires to be required to supply the actuating power.

Figure 5:
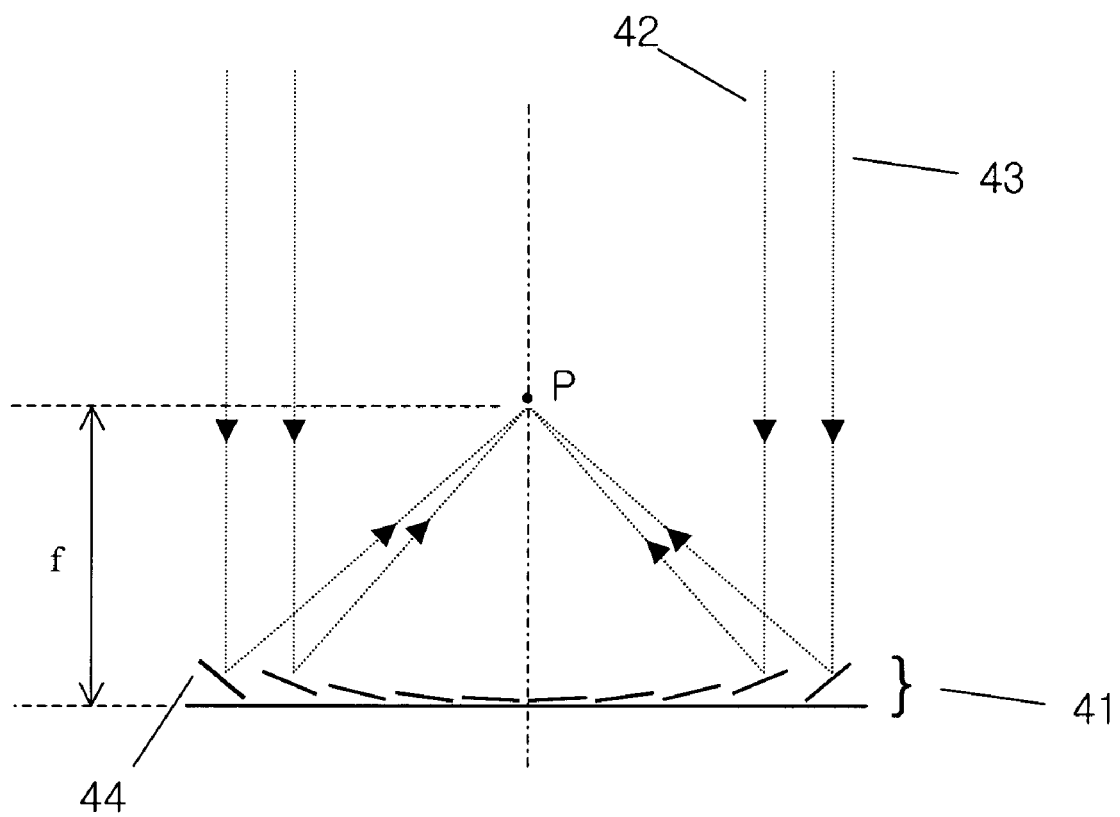
FIG. 5 is a schematic diagram showing how the DCMAL works as a lens.

FIG. 5 illustrates how a DCMAL 41 having a plurality of DCMs 44 images. Arbitrary scattered lights 42, 43 are converged into one point P of the image plane by controlling the positions of the DCMs 44. The phases of arbitrary light 42, 43 can be adjusted to be the same by translating the DCMs 44. The required translational displacement range is at least half of the wavelength of light.

It is desired that each of the DCMS 44 has a curvature because the ideal shape of a conventional reflective lens 22 has a curvature. If the size of the DCM is small enough, the aberration of the lens consisting of flat DCMs 44 is also small enough. In this case, the DCM does not need to have a curvature and can be flat.

The focal length f of the DCMAL 41 is changed by controlling the rotation and/or translation of each DCM 44. The DCMAL 41 can be made by controlling only rotation without controlling translation even though it has a relatively large aberration. In this case, the imaging quality of the lens 41 formed by controlling only rotation is degraded due to the aberration.

Figure 6:
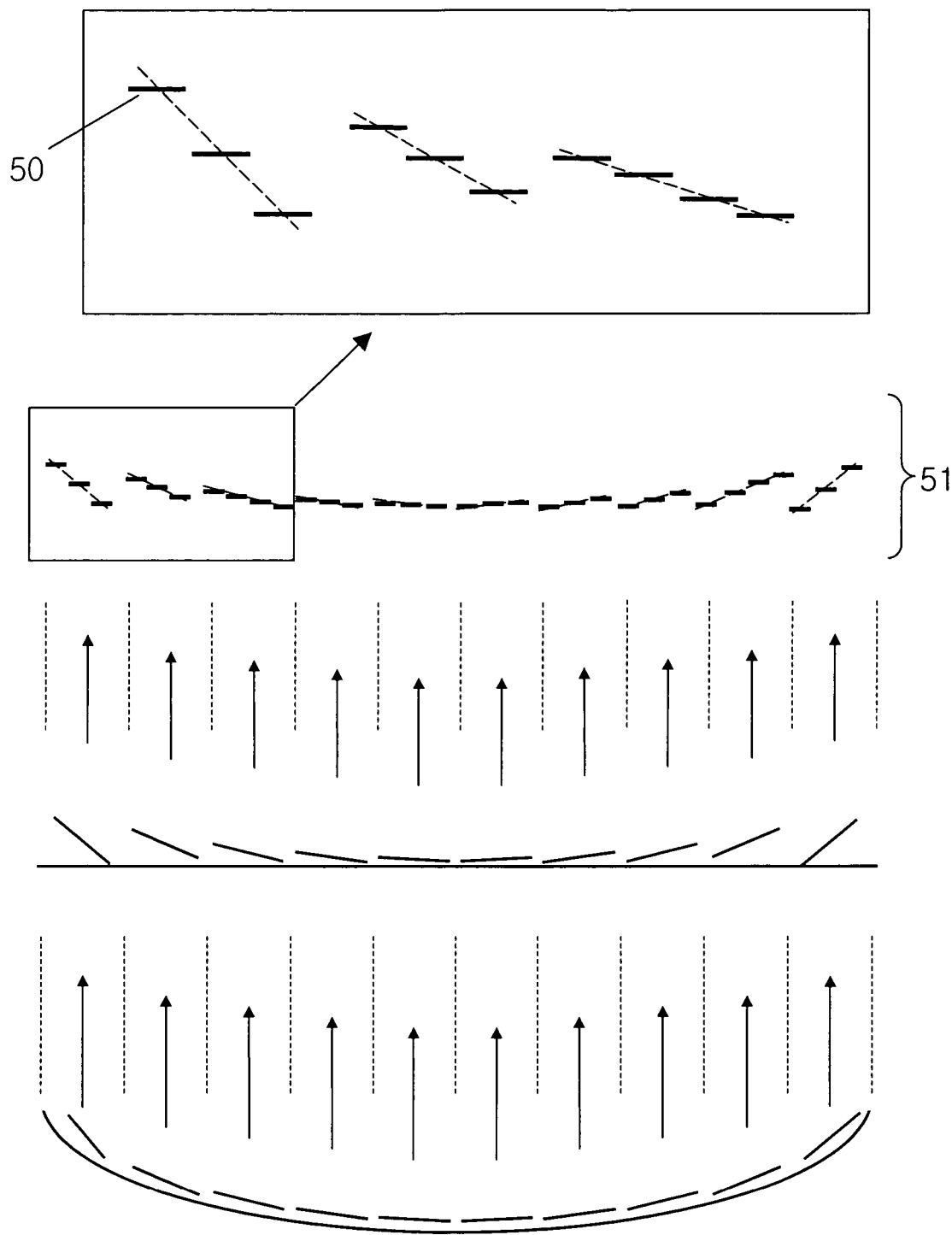
FIG. 6 is a schematic diagram showing the cut-away side view of a DCMAL lens with pure translation.

FIG. 6 illustrates a DCMAL 51 having a plurality of DCMs 50 made by pure translation without rotation of the DCM 50. Pure translation without rotation can also satisfy the two imaging conditions by Fresnel diffraction theory. The lens 51 formed by the control of only translation also has an aberration. The smaller the sizes of the DCMs 50 are, the less is the aberration. Even though the lens 51 with either only translation or only rotation has low quality, it is a useful lens design because its structure and control are much simpler than the lens with both rotation and translation.

Figure 7:
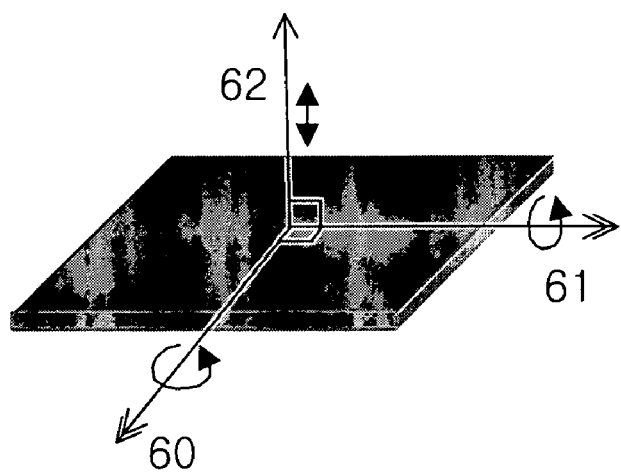
FIG. 7 is a schematic diagram showing two rotational axes and one translational axis of the DCM.

FIG. 7 shows a DCM with two rotational degrees of freedom and translation with one degree of freedom. The array consisting of DCMs with two degrees of freedom rotations 60, 61 or two degrees of freedom rotations 60, 61 and one degree of freedom translation 62 which are controlled independently can be a lens with arbitrary shape and/or size or a lens array consisting of lenses with arbitrary shape and/or size. Incident lights can be modulated arbitrarily by forming an arbitrary shape and/or size lens or a lens array comprising lenses with arbitrary shape and/or size. To do this, it is required that incident lights are deflected to arbitrary direction by controls of two degrees of freedom rotations 60, 61. Independent control for translation 62 of each DCM is also required to satisfy the phase condition.

Figure 8:
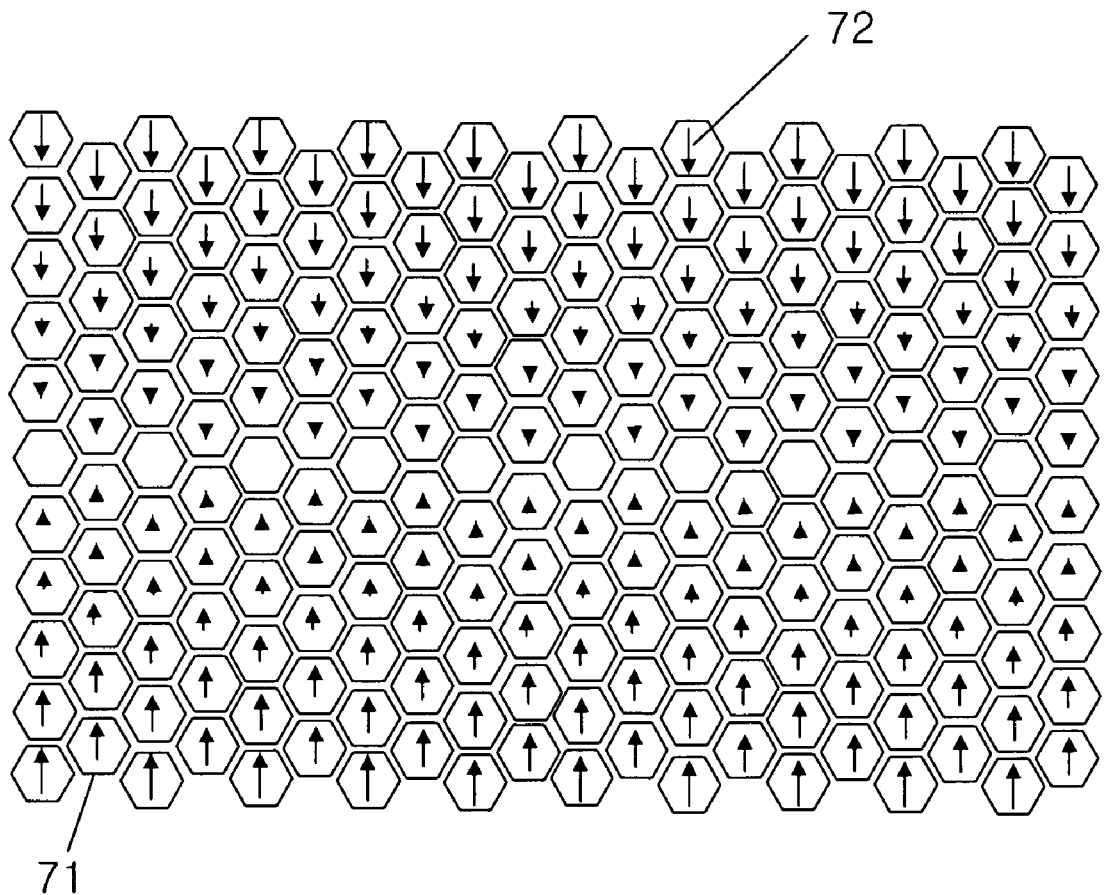
FIG. 8 is a schematic diagram showing the cylindrical DCMAL comprising hexagonal DCMs.
Figure 9:
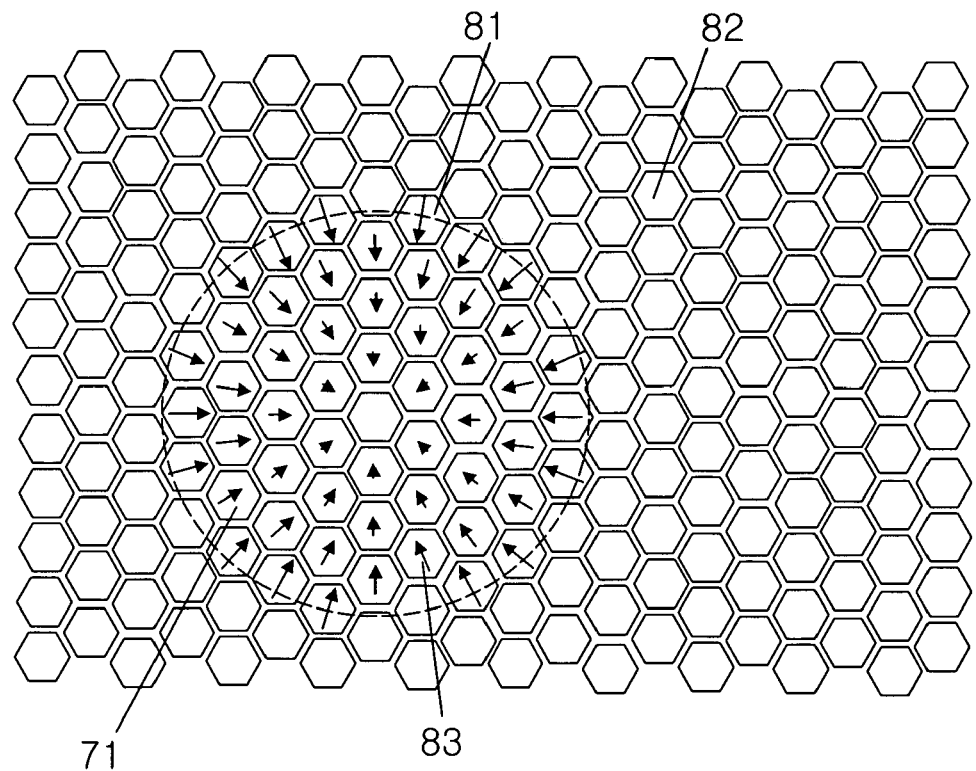
FIG. 9 is a schematic diagram showing the circular DCMAL comprising hexagonal DCMs.
Figure 10:
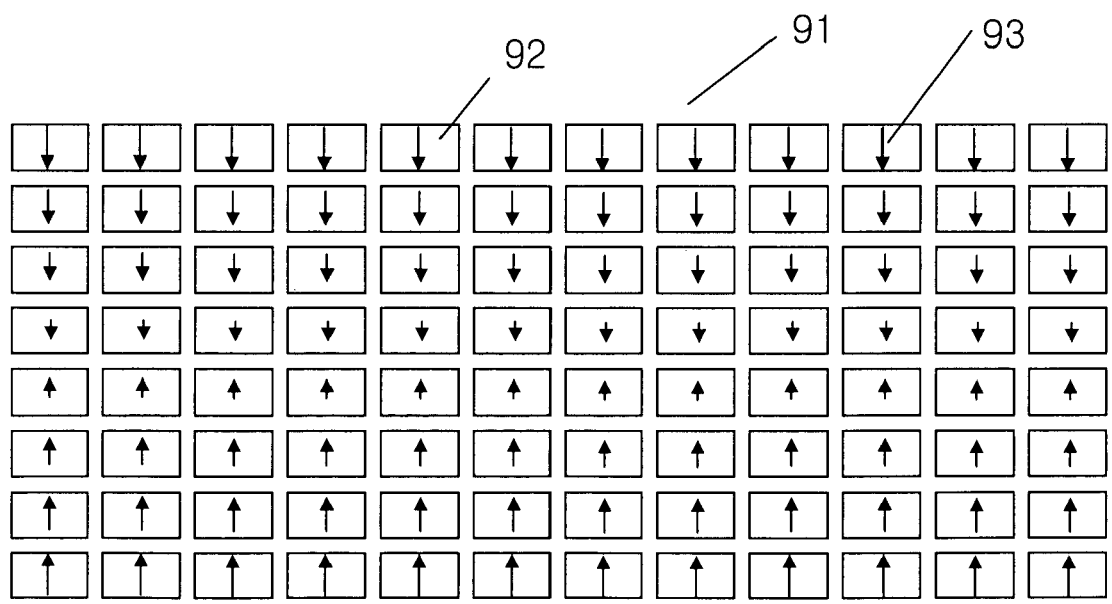
FIG. 10 is a schematic diagram showing the cylindrical DCMAL comprising rectangular DCMs.
Figure 11:
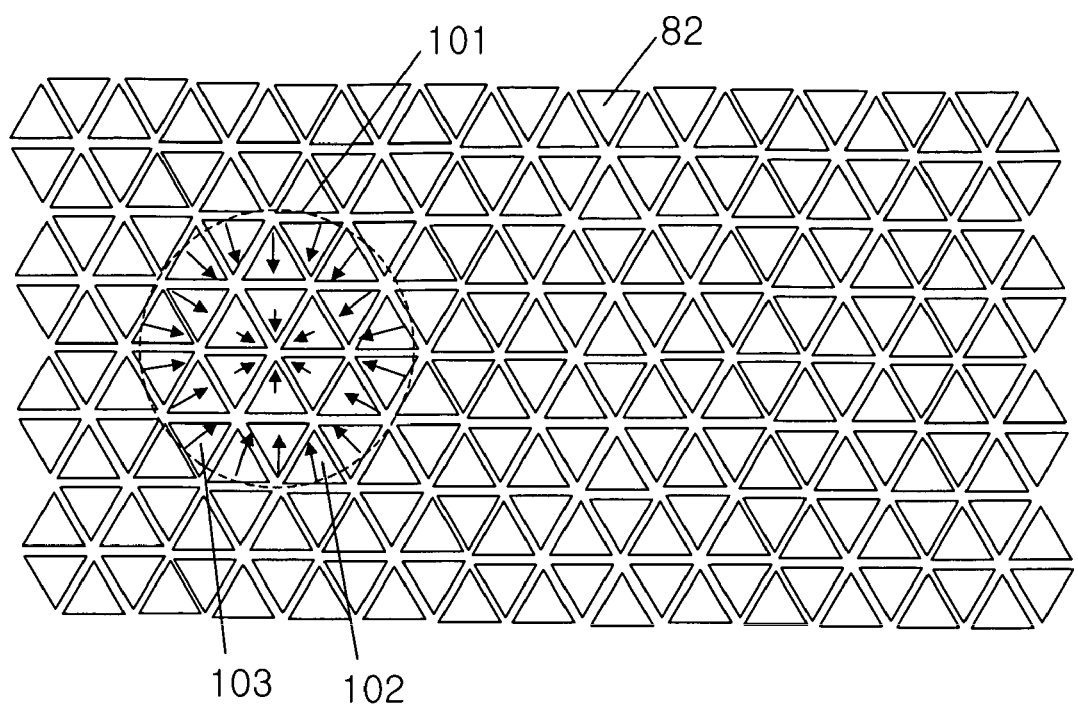
FIG. 11 is a schematic diagram showing the circular DCMAL comprising triangular DCMs.

In FIGS. 8-13, the rotational amount of the micromirror is represented by lengths of arrows 72, 83, 93, 103, 112, 122 respectively and the rotational direction of the micromirror is represented by directions of arrows 72, 83, 93, 103, 112, 122, respectively. FIG. 8 shows a variable focal length cylindrical DCMAL comprising hexagonal micromirrors 71. FIG. 9 shows a variable focal length circular DCMAL 81 comprising hexagonal micromirrors 71. Shape, position and size of the variable focal length circular lens 81 can be changed by independent controls of micromirrors 71 with two rotations and one translation. Even though FIGS. 8 and 9 show hexagonal micromirrors 71, fan shape, rectangle, square, and triangle micromirrors array can be used. An array comprising fan shape micromirrors is appropriate to an axisymmetric lens as shown in FIG. 4. FIG. 10 shows a variable focal length cylindrical DCMAL 91 comprising rectangular micromirrors 92. An array comprising square or rectangular micromirrors 92 is appropriate to a symmetric lens about one axis of in-plane such as cylindrical DCMAL 91. FIG. 11 shows a variable focal length circular DCMAL 101 comprising triangular micromirrors 102. An array comprising triangular micromirrors 102 is appropriate to a lens with arbitrary shape and/or size as an array comprising hexagonal micromirrors.

Figure 12:
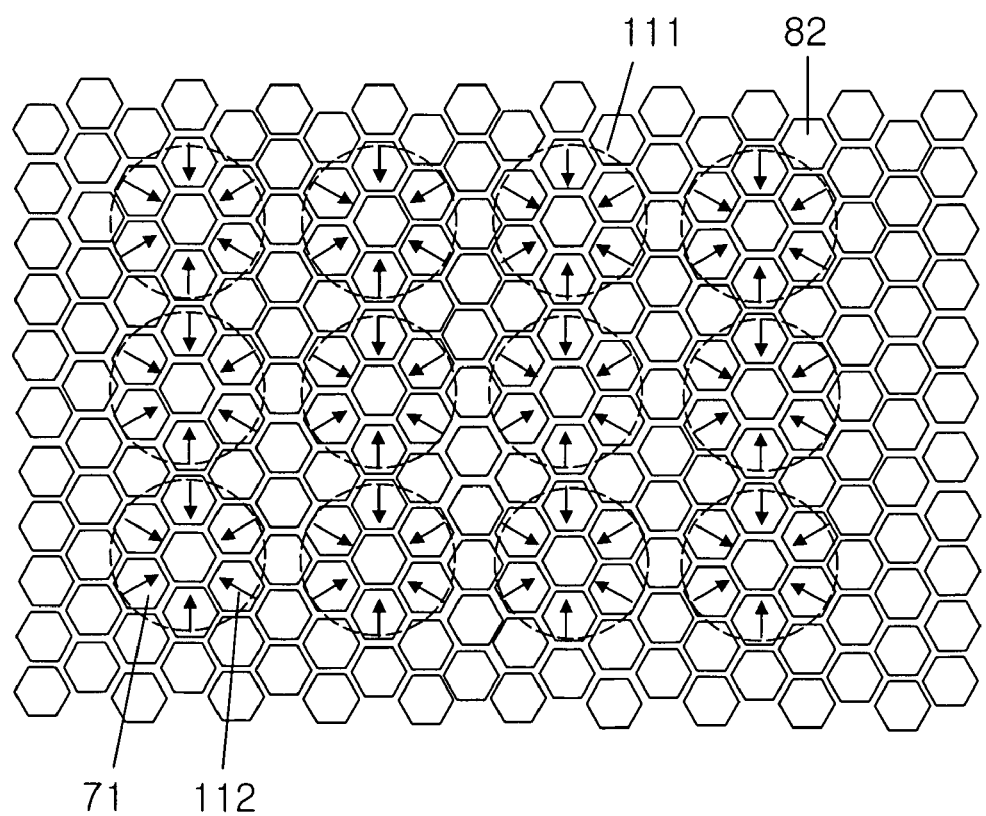
FIG. 12 is a schematic diagram showing the array of DCMAL comprising hexagonal DCMs.
Figure 13:
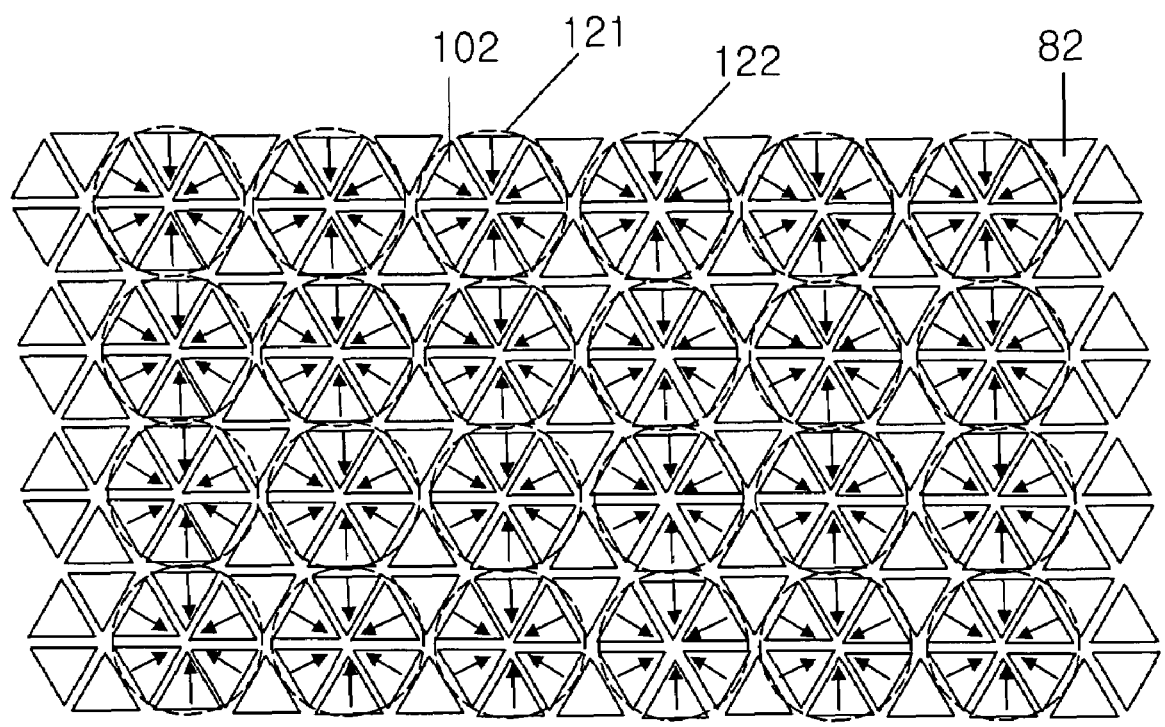
FIG. 13 is a schematic diagram showing the array of DCMAL comprising triangular DCMs.

FIG. 12 shows an array of the variable focal length DCMAL 111 comprising hexagonal micromirrors 71. FIG. 13 shows an array of the variable focal length DCMAL 121 comprising triangular micromirrors 102. In FIGS. 9, 11, 12 and 13, micromirrors 82 which are not elements of the lens are controlled to make lights reflected by the micromirrors 82 have no influence on imaging or focusing.

The DCMAL is an adaptive optical component because the phase of light can be changed by controlling the translations 62 and/or rotations 60, 61 of micromirrors independently. Adaptive optical DCMAL requires two-dimensional array of individually addressable micromirrors. To achieve this, the micromirrors can be combined with on-chip electronics. In order to do this, wafer-level integration of micromirrors with the microelectronics circuits may be performed.

The DCMAL can correct the phase errors since an adaptive optical component can correct the phase errors of light due to the medium between the object and its image and/or correct the defects of a lens system that cause its image to deviate from the rules of paraxial imagery. For example, the DCMAL can correct the phase error due to optical tilt by adjusting the translations 62 and/or rotations 60, 61 of micromirrors.

The same phase condition satisfied by the DCMAL contains an assumption of monochromatic light. Therefore, to get a color image, the DCMAL is controlled to satisfy the same phase condition for each wavelength of Red, Green, and Blue (RGB), respectively, and the imaging system can use bandpass filters to make monochromatic lights with wavelengths of Red, Green, and Blue (RGB).

If a color photoelectric sensor is used as an imaging sensor in the imaging system using the DCMAL, a color image can be obtained by processing electrical signals from Red, Green, and Blue (RGB) imaging sensors with or without bandpass filters, which should be synchronized with the controls of DCMAL. To image Red light scattered from an object, the DCMAL is controlled to satisfy the phase condition for Red light. During the operation, Red, Green, and Blue imaging sensors measure the intensity of each Red, Green, and Blue light scattered from an object. Among them, only the intensity of Red light is stored as image data because only Red light is imaged properly. To image each Green or Blue light, the DCMAL and each imaging sensor work in the same manner as the process for the Red light. Therefore, the DCMAL is synchronized with Red, Green, and Blue imaging sensors. Alternatively, the same phase condition for a color image is satisfied by using the least common multiple of wavelengths of Red, Green, and Blue lights as an effective wavelength for the phase condition. In this case, it is not necessary for the DCMAL to be controlled to satisfy the phase condition for each Red, Green, and Blue light individually. Instead of it, the phase condition for the least common multiple of the wavelengths should be satisfied.

For the simpler control, the translation of each micromirror is only controlled to satisfy the phase condition for one light among Red, Green, and Blue lights or is not controlled to satisfy the phase condition for any light of them. Even though the DCMAL is not controlled to satisfy the phase condition for all wavelengths, the lens still can be used as a variable focal length lens with low quality.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A variable focal length lens comprising a plurality of Variably Supported Discretely Controlled Micromirrors (VSDCMs), wherein the VSDCM comprises
    a) a substrate;
    b) a micromirror; and
    c) a plurality of variable supports that are placed between the micromirror and the substrate, wherein at least one of the variable supports is controlled to change height of the variable support;
    wherein the controlled variable supports determine the position of the micromirror and wherein the micromirror rests on the controlled variable supports.

2. The variable focal length lens of claim 1, wherein the variable supports are located under the micromirror.

3. The variable focal length lens of claim 1, wherein each of the variable supports is controlled to change its height whereby the position of the micromirror is controlled.

4. The variable focal length lens of claim 1, wherein the rotation of the VSDCM is controlled.

5. The variable focal length lens of claim 1, wherein the translation of the VSDCM is controlled.

6. The variable focal length lens of claim 1, wherein the rotation and translation of the VSDCM are controlled.

7. The variable focal length lens of claim 1, wherein two degrees of freedom rotation of the VSDCM is controlled.

8. The variable focal length lens of claim 1, wherein two degrees of freedom rotation and one degree of freedom translation of the VSDCM are controlled.

9. The variable focal length lens of claim 1, wherein the VSDcMs are controlled independently.

10. The variable focal length lens of claim 1, wherein the VSDCM is actuated by electrostatic force.

11. The variable focal length lens of claim 1, wherein the VSDcMs are arranged to form one or more concentric circles to form the lens.

12. The variable focal length lens of claim 11, wherein the VSDCMs on same concentric circles are controlled by the same electrodes.

13. The variable focal length lens of claim 1, wherein a control circuitry is provided under the micromirrors, wherein the control circuitry is made with microelectronics fabrication technologies.

14. The variable focal length lens of claim 1, wherein the reflective surface of the VSDCM is substantially flat.

15. The variable focal length lens of claim 1, wherein the reflective surface of the VSDCM has a curvature.

16. The variable focal length lens of claim 15, wherein curvature of the VSDCM is controlled.

17. The variable focal length lens of claim 16, wherein the curvature of the VSDCM is controlled by electrothermal force.

18. The variable focal length lens of claim 16, wherein the curvature of the VSDCM is controlled by electrostatic force.

19. The variable focal length lens of claim 1, wherein the VSDCM has a fan shape.

20. The variable focal length lens of claim 1, wherein the VSDCM has a hexagonal shape.

21. The variable focal length lens of claim 1, wherein the VSDCM has a rectangular shape.

22. The variable focal length lens of claim 1, wherein the VSDCM has a square shape.

23. The variable focal length lens of claim 1, wherein the VSDCM has a triangular shape.

24. The variable focal length lens of claim 1, wherein the lens has an arbitrary size and/or shape.

25. The variable focal length lens of claim 1, wherein all the VSDcMs are arranged in a flat plane.

26. The variable focal length lens of claim 1, wherein the surface material of the VSDCM is the one with high reflectivity.

27. The variable focal length lens of claim 1, wherein the surface material of the VSDCM is metal.

28. The variable focal length lens of claim 1, wherein the surface material of the VSDCM is metal compound.

29. The variable focal length lens of claim 1, wherein the surface of the VSDCM is made by multi-layered dielectric coating.

30. The variable focal length lens of claim 1, wherein a mechanical structure upholding the micromirror and actuating components are located under the micromirror.

31. The variable focal length lens of claim 1, wherein the lens is an adaptive optical component, wherein the lens compensates for phase errors of light due to the medium between an object and its image.

32. The variable focal length lens of claim 1, wherein the lens is an adaptive optical component, wherein the lens corrects aberrations.

33. The variable focal length lens of claim 1, wherein the lens is an adaptive optical component, wherein the lens corrects the defects of an imaging system that cause the image to deviate from the rules of paraxial imagery.

34. The variable focal length lens of claim 1, wherein the lens is controlled to satisfy the same phase condition for each wavelength of Red, Green, and Blue (RGB), respectively, to get a color image.

35. The variable focal length lens of claim 1, wherein the lens is controlled to satisfy the same phase condition for one wavelength among Red, Green, and Blue (RGB) to get a color image.

36. The variable focal length lens of claim 1, wherein the same phase condition for color imaging is satisfied by using the least common multiple of wavelengths of Red, Green, and Blue lights as an effective wavelength for the phase condition.

37. The variable focal length lens of claim 1, wherein the lens is an adaptive optical component, wherein an object which does not lie on the optical axis can be imaged by the lens without macroscopic mechanical movement.

38. An array of the variable focal length lenses, wherein each of the variable focal length lens comprises a plurality of Variably Supported Discretely Controlled Micromirrors (VSDCMs), wherein the VSDCM comprises
   a) a substrate;
   b) a micromirror; and
   c) a plurality of variable supports that are placed between the micromirror and the substrate, wherein at least one of the variable supports is controlled to change height of the variable support;
   wherein the controlled variable supports determine the position of the micromirror and wherein the micromirror rests on the controlled variable supports.

39. The array of the lenses of claim 38, wherein each variable focal length lens has independent focal length variation.

40. the array of the lenses of claim 38, wherein the rotation of the VSDCM is controlled.

41. The array of the lenses of claim 38, wherein the translation of the VSDCM is controlled.

42. The array of the lenses of claim 38, wherein the rotation and translation of the VSDCM are controlled.

43. The array of the lenses of claim 38, wherein two degrees of freedom rotation of the VSDCM is controlled.

44. The array of the lenses of claim 38, wherein two degrees of freedom rotation and one degree of freedom translation of the VSDCM are controlled.

45. The array of the lenses of claim 38, wherein the VSDcMs are controlled.

46. The array of the lenses of claim 38, wherein the VSDcMs are actuated by electrostatic force.

47. The array of the lenses of claim 38, wherein a control circuitry is provided under the micromirrors, wherein the control circuitry is made with microelectronics fabrication technologies.

48. The array of the lenses of claim 38, wherein the reflective surface of the VSDCM is substantially flat.

49. The array of the lenses of claim 38, wherein the reflective surface of the VSDCM has a curvature.

50. The array of the lenses of claim 38, wherein the curvatures of the VSDCMs are controlled.

51. The array of the lenses of claim 50, wherein the curvature of the VSDCM are controlled by electrothermal force.

52. The array of the lenses of claim 50, wherein the curvatures of the VSDCMs are controlled by electrostatic force.

53. The array of the lenses of claim 38, wherein the VSDCM has a fan shape.

54. The array of the lenses of claim 38, wherein the VSDCM has a hexagonal shape.

55. The array of the lenses of claim 38, wherein the VSDCM has a rectangular shape.

56. The array of the lenses of claim 38, wherein the VSDCM has a square shape.

57. The array of the lenses of claim 38, wherein the VSDCM has a triangular shape.

58. The array of the lenses of claim 38, wherein the lens has arbitrary shape and/or size.

59. The array of the lenses of claim 38, wherein the VSDCMs are controlled to change the focal length of each lens of the lens array.

60. The array of the lenses of claim 38, wherein all the VSDcMs are arranged in a flat plane.

61. The array of the lenses of claim 38, wherein the VSDcMs are arranged to form one or more concentric circles to form a lens.

62. The array of the lenses of claim 61, wherein the VSDcMs on the same concentric circles are controlled by the same electrodes.

63. The array of the lenses of claim 38, wherein the surface material of the VSDcMs is the one with high reflectivity.

64. The array of the lenses of claim 38, wherein the surface material of the VSDCM is metal.

65. The array of the lenses of claim 38, wherein the surface material of the VSDCM is metal compound.

66. The array of the lenses of claim 38, wherein the surface of the VSDCM is made by multi-layered dielectric coating.

67. The array of the lenses of claim 38, wherein a mechanical structure upholding the VSDcMs and actuating components are located under the VSDCMs.

68. The array of the lenses of claim 38, wherein the lens is an adaptive optical component, wherein the lens compensates for phase errors of light due to the medium between an object and its image.

69. The array of the lenses of claim 38, wherein the lens is an adaptive optical component, wherein the lens corrects aberrations.

70. The array of the lenses of claim 38, wherein the lens is an adaptive optical component, wherein the lens corrects the defects of an imaging system that cause the image to deviate from the rules of paraxial imagery.

71. The array of the lenses of claim 38, wherein the lens is an adaptive optical component, wherein an object which does not lie on the optical axis can be imaged by the lens without macroscopic mechanical movement.

72. The array of the lenses of claim 38, wherein the lens is controlled to satisfy the same phase condition for each wavelength of Red, Green, and Blue (RGB), respectively, to get a color image.

73. The array of the lenses of claim 38, wherein the lens is controlled to satisfy the same phase condition for one wavelength among Red, Green, and Blue (RGB) to get a color image.

74. The array of the lenses of claim 38, wherein the same phase condition for color imaging is satisfied by using the least common multiple of wavelengths of Red, Green, and Blue lights as an effective wavelength for the phase condition.

75. The variable focal length lens of claim 1, wherein the VSDCMs are controlled to change the focal length of the lens and to satisfy the same phase condition for the lights.

76. The variable focal length lens of claim 1, wherein the lens changes the focal length and corrects aberrations.

77. The variable focal length lens of claim 1, wherein the variable supports are controlled by electrostatic force.

78. The variable focal length lens of claim 76, wherein the electrostatic force is controlled by digital and/or discrete operation of a voltage.

79. The variable focal length lens of claim 1, wherein the micromirrors rest on the controlled variable support by attractive force.

80. The array of the lenses of claim 38, wherein each lens in the array is controlled independently.

81. The array of the lenses of claim 38, wherein each lens in the array is independently controlled to change the optical axis.

* * * * *